(12) United States Patent
Mehra et al.

(10) Patent No.: US 7,468,982 B2
(45) Date of Patent: Dec. 23, 2008

(54) METHOD AND APPARATUS FOR CLUSTER INTERCONNECTION USING MULTI-PORT NODES AND MULTIPLE ROUTING FABRICS

(75) Inventors: Pankaj Mehra, Cupertino, CA (US); Robert W. Horst, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1323 days.

(21) Appl. No.: 10/291,865

(22) Filed: Nov. 7, 2002

(65) Prior Publication Data

US 2004/0004963 A1    Jan. 8, 2004

Related U.S. Application Data

(60) Provisional application No. 60/393,936, filed on Jul. 2, 2002.

(51) Int. Cl.
*H04L 12/28* (2006.01)
(52) U.S. Cl. .......................... 370/400; 370/386
(58) Field of Classification Search ............... None
See application file for complete search history.

(56) References Cited

U.S. PATENT DOCUMENTS

| | | | | |
|---|---|---|---|---|
| 3,701,112 | A * | 10/1972 | Hagelbarger | 370/372 |
| 5,243,704 | A | 9/1993 | Baty et al. | |
| 5,892,932 | A | 4/1999 | Kim | |
| 6,614,762 | B1 * | 9/2003 | Illiadis et al. | 370/252 |
| 6,947,433 | B2 * | 9/2005 | Carvey | 370/401 |
| 7,039,058 | B2 * | 5/2006 | Carvey | 370/400 |
| 7,046,633 | B2 * | 5/2006 | Carvey | 370/238 |
| 2001/0017845 | A1 * | 8/2001 | Bauer | 370/238 |
| 2002/0048272 | A1 * | 4/2002 | Carvey | 370/400 |
| 2003/0031123 | A1 * | 2/2003 | Gilmour et al. | 370/216 |
| 2005/0080836 | A1 | 4/2005 | Chopping et al. | |
| 2005/0160131 | A1 | 7/2005 | Chopping et al. | |

OTHER PUBLICATIONS

The CRC Handbook of Combinatorial Designs, edited by Charles J. Colboum, Department of Combinatorics and Optimization, University of Waterloo, and Jeffrey H. Dinitz, Department of Mathematics and Statistics, University of Vermont, CRC Press.

* cited by examiner

*Primary Examiner*—Bob A. Phunkulh

(57) ABSTRACT

Interconnect networks are described that allow nodes having more than two ports to be interconnected. More particularly, each node interfaces with multiple and more than two, fabrics. Also, all fabrics are incomplete in that not every node interfaces with every fabric, and no fabric includes all the nodes, yet every pair of nodes appears together in at least one fabric. Nodes are used that appear together in a fabric as a class of nodes that exhibit similar interconnection properties. The present invention allows for scalable, high-performance and reliable interconnection of large numbers of end nodes while satisfying constraints on architecture of end nodes and networking equipment. Bounds for the number of fabrics and fabric size are disclosed for designing an optimized interconnection network.

33 Claims, 6 Drawing Sheets

US 7,468,982 B2

METHOD AND APPARATUS FOR CLUSTER INTERCONNECTION USING MULTI-PORT NODES AND MULTIPLE ROUTING FABRICS

REFERENCE TO EARLIER APPLICATION

This application claims the benefit of U.S. Provisional Application No. 60/393,936 filed Jul. 2, 2002 which is herein incorporated by reference.

FIELD OF THE INVENTION

The present invention relates to the field of digital communication. More particularly, the present invention relates to a method and apparatus implementing a communications network.

BACKGROUND OF THE INVENTION

In modern computer systems, much of their functionality is realized by the ability to network, that is connect, various computers to provide digital communication. Indeed many interconnection schemes have been developed that meet certain needs in various ways. For example, multiprocessor systems can be configured as bus-connected or ring-connected multiprocessor systems. However, the operation and design constraints of such systems do not lead to designs for reliable and scalable switched networks, especially ones that implement crossbar switches employing wormhole routing. The primary limitation of this type of configuration is that ring topologies are not suitable for wormhole-routed switched networks and result in an unacceptably large hop count between end nodes as the number of nodes is scaled.

In another example, the design of bus-oriented interconnection topologies for single-hop communication among multiple transceiver stations is not applicable to scalable switched networks because, among other things, a single-hop interconnection between a large number of nodes is impossible when crossbar switches with a limited number of ports are used. Moreover, such designs use bus-based interconnects which bear little resemblance, if any, to switched interconnects.

Non-bus-oriented single-hop interconnections are also deficient in a number of ways. For example, such configurations suffer the same limitations as described above while also connecting nodes (or switchless networks) directly. This latter feature limits the applicability of the design to end nodes having a large number of ports and to fabrics having zero switches and hence is inapplicable to the design of switched interconnects.

In a traditional approach, ServerNet networks have been designed with two ports, also called colored ports or "X" and "Y" ports, connected to two complete, independent groups of crossbar switches. The interconnection group is complete because every end node interfaces with each group of crossbar switches and each group of switches interfaces with every node. Moreover, the interconnection group is independent because ports of one type are only connected to other ports of the same type. For example, each of the X ports is only connected via an X fabric to other X ports and each of the Y ports in the network are likewise only connected via a Y fabric to other Y ports. Note here that an X fabric is a group of switches that connect all the X ports and only the X ports in the network (similarly for Y ports). In this way, a fabric of one type is designed independently of other fabrics of other types.

A particular concern in network design is fault tolerance. With a large scaled system there is insufficient protection against single points of failure because of the large number of components and it is hard to maintain symmetry because of failed parts. Moreover, scalable topologies (e.g. fat trees) offer design points exponentially far apart. In addition, the relative capacity of an end node shrinks as a network grows in size.

One improved approach has introduced ServerNet Asymmetric Fabrics. With this approach, end nodes are connected using two complete but non-identical groups of switches. However, network expansion requires scalable switched networks. Switched processor-memory subsystems include Sun UE10K, Intel Profusion Chipset, Compaq Alpha EV7. Switched I/O subsystems include ServerNet, NGIO (Next Generation I/O), and Future I/O. However, the issue is scalable yet highly available fabrics. Hence, there is a further need for optimizing the reliability and performance of scalable switched networks.

There exists prior art in the area of bus-connected and ring-connected multi-computer systems, however, the operation and design constraints of such prior art does not lead to designs for reliable and scalable switched networks, especially networks configured for use with crossbar switches employing wormhole routing. Moreover, the prior art does not address how a network comprising multiple incomplete fabrics can simultaneously optimize the reliability and the performance of scalable switched networks.

While the above interconnection schemes provide certain functionality, they are nonetheless limited in at least the ways discussed above. With the advent of network interface cards and other similar devices that provide for multiple ports on one computer system, network design can be expanded beyond the constraints of prior art systems. Importantly, interconnection fabrics need not be constrained to being complete nor colored. Notably, interconnection fabrics can be allowed to be incomplete while allowing for improved fault tolerance while using reduced hardware resources. Toward finding an optimal design, however, there exists a need to determine bounds on various parameters of network designs.

SUMMARY OF THE INVENTION

In an embodiment of the invention, an interconnect network is designed so as to allow nodes having more than two ports to be interconnected. More particularly, in an embodiment of the invention, each node interfaces with more than two fabrics. Also, all fabrics are incomplete in that not every node interfaces with every fabric, and no fabric interfaces with all the nodes, yet every pair of nodes interfaces to at least one common fabric. The present invention uses nodes that appear together in a fabric as a class of nodes that exhibit similar interconnection properties. The present invention allows for scalable, high-performance and reliable interconnection of large numbers of end nodes while satisfying constraints on architecture of end nodes and networking equipment including fabrics that comprise n-port crossbar switches.

In one embodiment of the invention, a multi-fabric interconnection system is disclosed, comprising k interconnection fabrics and n nodes. The k interconnection fabrics each have a vertex cardinality, m. The n nodes each have p ports, wherein p is greater than two, and wherein every pair of nodes from among the n nodes is interconnected through at least one of the k interconnection fabrics. Also, each of the k interconnection fabrics interconnects less than all of the n nodes. In this embodiment of the invention, the number k of interconnection fabrics is bounded above by the relationship $$k \le \binom{p+1}{2}.$$

In another embodiment, the number k of the interconnection fabrics is bounded below by the relationship $$k \ge \left\lceil \frac{\binom{n}{2}}{\binom{m}{2}} \right\rceil.$$

In yet another embodiment, the optimal fabric size, $m_O$, is bounded above by the relationship $$m_O \le 2\left\lceil \frac{n}{p+1} \right\rceil.$$

And in still another embodiment, the optimal fabric size, $m_O$, is bounded below by the relationship $$m_O \ge \left\lceil \frac{n+p-1}{p} \right\rceil.$$

In another embodiment, each fabric provides redundant connectivity to all nodes to allow continued connectivity in spite of the failure of part of a network.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Figure 1:
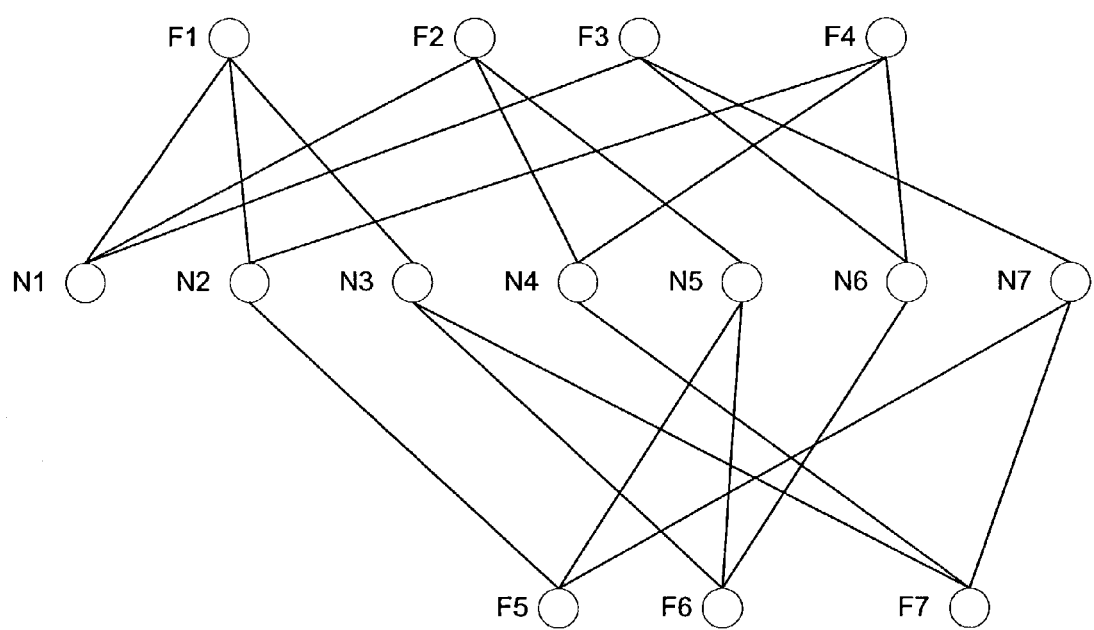
FIG. 1 is network diagram for interconnecting seven nodes each with three ports according to an embodiment of the present invention.

In order to understand the present invention, it is useful to understand combinatorial block design and, in particular, balanced incomplete block design (BIBD). A block is a subset, s, of a set of elements, S, where block design considers choosing blocks with certain properties. A block design is called incomplete if at least one block does not contain all of the set elements. A block design is balanced if each block has the same number of elements and each pair of elements occurs in a block the same number of times. In the present invention, BIBDs are used to design networks that have predetermined characteristics or properties.

A BIBD is a pair (V, B) where V is a set of v elements and B is a collection of b blocks that are subsets of k elements of V such that each element of V is contained in exactly r blocks and any two-subsets of V is contained in exactly λ blocks. The variables v, b, r, k, and λ are parameters of a BIBD also referred to as 2–(v, b, r, k, λ) block designs. Two necessary conditions must be met for the existence of a BIBD: (1) vr=bk, and (2) r(k−1)=λ(v−1). A consequence of these conditions is that three parameters, v, k, and λ, determine the remaining two parameters, r and b, where $$r(k-1)=\lambda(v-1)$$

$$r = \frac{\lambda(v-1)}{k-1}, \quad \text{(Equation 1)}$$

and $$bk=vr$$

$$b = \frac{vr}{k}. \quad \text{(Equation 2)}$$

With regard to Equation 1, consider that an element, x, occurs in r blocks. Further consider that each of the blocks, x, is paired with k−1 elements. Thus, we have r(k−1) pairs. Note that x is paired with all other v−1 nodes exactly λ times (i.e., λ(v−1)) and Equation 1 is therefore proven. It is straightforward to see that each block, b, contains k elements for a total of bk elements. Also, each element occurs in r blocks and since there are v elements the total is vr, thus we have Equation 2.

Accordingly, a BIBD (v, b, r, k, λ) design can also be referred to as a (v, k, λ) design. The notation 2–(v, k, λ) is also used, since BIBDs are t-designs of the form t–(v, k, λ) with t=2. Note that when λ=1 (i.e., 2–(v, k, 1)), the notation S(2, k, v) is also used denoting that these are Steiner systems (named after nineteenth century geometer Jakob Steiner). With regard to Steiner systems, given three integers, t, k, v, such that 2≤t<k<v, a Steiner system S(t, k, v) is a set V of v elements together with a family, B, of subsets of k elements of V (i.e., blocks) with the property that every subset of t elements of S is contained in exactly one block. Recall that in BIBD, t=2. These systems therefore determine the number of groups that are needed to connect v items, arranged in groups of k, such that a pair (i.e., "2–") appears in exactly λ groups, where in a Steiner system λ=1 group.

Moreover, from Fisher's inequality, b≥v, designs with b=v and r=k are called symmetric designs where every block contains k elements and every element occurs in r blocks. Also, every pair of elements occurs in λ blocks, and every pair of blocks intersects in λ elements.

Whereas BIBD designs can be quite complicated they can be represented in a two-dimensional, k×b array in which each column contains the elements forming a block. For example, consider the 2–(9, 3, 1)=12 design:

$$\text{Elements} \begin{Bmatrix} 0 & 0 & 0 & 0 & 1 & 1 & 1 & 2 & 2 & 2 & 3 & 6 \\ 1 & 3 & 4 & 5 & 3 & 4 & 5 & 3 & 4 & 5 & 4 & 7 \\ 2 & 6 & 8 & 7 & 8 & 7 & 6 & 7 & 6 & 8 & 5 & 8 \end{Bmatrix} \overset{\text{Block}}{}$$

Here, for example, the first column represents the block containing elements $e_0$, $e_1$, and $e_2$ and the twelfth column represents a block having elements $e_6$, $e_7$, and $e_8$. In a larger design, letters can be used to represent blocks with more than 10 elements. The sequence 0, 1, ..., 9, a, b, ..., z can represent designs with up to 36 elements (i.e., 10 numerically represented elements and 26 alphabetically represented elements). Thus, the following 2–(16, 4, 1)=20 design can be represented as follows:

$$\text{Elements} \begin{Bmatrix} 0 & 0 & 0 & 0 & 0 & 1 & 1 & 1 & 1 & 2 & 2 & 2 & 2 & 3 & 3 & 3 & 3 & 4 & 5 & 6 \\ 1 & 4 & 7 & a & d & 4 & 5 & 6 & 9 & 4 & 5 & 6 & 8 & 4 & 5 & 6 & 7 & 8 & 9 & 7 \\ 2 & 5 & 8 & b & e & 7 & b & 8 & c & c & 7 & 9 & a & 9 & 8 & a & b & b & a & c \\ 3 & 6 & 9 & c & f & a & d & e & f & e & f & b & d & d & c & f & e & f & e & d \end{Bmatrix} \overset{\text{Block}}{}$$

With a design in hand, a BIBD can be further described by an incidence matrix A which has the blocks as its columns and elements (i.e., nodes) as the rows. Thus, an entry, $a_{i,j}$ of the incidence matrix A is equal to one if the ith element resides in the jth block, otherwise it is equal to zero. For example, for a symmetric design with N elements, the incidence matrix is an N×N matrix. Accordingly, the 2–(9, 3, 1)=12 design $$\text{Elements} \begin{Bmatrix} 0 & 0 & 0 & 0 & 1 & 1 & 1 & 2 & 2 & 2 & 3 & 6 \\ 1 & 3 & 4 & 5 & 3 & 4 & 5 & 3 & 4 & 5 & 4 & 7 \\ 2 & 6 & 8 & 7 & 8 & 7 & 6 & 7 & 6 & 8 & 5 & 8 \end{Bmatrix} \overset{\text{Block}}{}$$

described above is represented by the following incidence matrix $$A_{2-(9,3,1)} = \begin{bmatrix} 1 & 1 & 1 & 1 & 0 & 0 & 0 & 0 & 0 & 0 & 0 & 0 \\ 1 & 0 & 0 & 0 & 1 & 1 & 1 & 0 & 0 & 0 & 0 & 0 \\ 1 & 0 & 0 & 0 & 1 & 0 & 0 & 1 & 1 & 1 & 0 & 0 \\ 0 & 1 & 0 & 0 & 1 & 0 & 0 & 1 & 0 & 0 & 1 & 0 \\ 0 & 0 & 1 & 0 & 0 & 1 & 0 & 0 & 1 & 0 & 1 & 0 \\ 0 & 0 & 0 & 1 & 0 & 0 & 1 & 0 & 0 & 1 & 1 & 0 \\ 0 & 0 & 0 & 0 & 0 & 1 & 0 & 1 & 0 & 0 & 0 & 1 \\ 0 & 0 & 0 & 1 & 0 & 1 & 0 & 1 & 0 & 0 & 0 & 1 \\ 0 & 1 & 1 & 0 & 1 & 0 & 0 & 0 & 0 & 1 & 0 & 1 \end{bmatrix} \begin{matrix} \\ \\ \\ \\ \text{Incidence of Elements} \\ \\ \\ \\ \end{matrix}$$

From a BIBD, network designs can in turn be generated by identifying certain correspondences. For example, given the blocks of a BIBD (v, k, λ), the mapping between BIBD and network design are given by the following table.

TABLE 1

Mapping from Block Design to Network Design

| Block Design | Network Design |
| --- | --- |
| Elements | Nodes |
| Blocks | Fabrics |
| λ (i.e., pairwise occurrence) | Fabrics between each pair |
| r (i.e., total occurrence of an element) | Degree of a node |
| k (i.e., block size) | Length of routing |

A solution to a BIBD provides a partition of the v nodes into subsets such that there are exactly λ subsets for each pair of the nodes and the distance between any two nodes is at most k−1. The first property ensures that the target topology for the network is strongly connected. The second property is important to obtain a bound on the maximum routing length which is measured by the number of hops. Each block of a BIBD leads to one or two virtual rings (depending on the embedding technique), and each node of the network has one or more virtual nodes on each virtual ring. A virtual node is created when a virtual ring traverses a physical node.

Thus, the two important parameters of a block design are k and r. The size k of each block determines the maximum length of routing and the total number of occurrences, r, of each node determines the degree requirement for such node in the target network. Particularly, smaller k leads to a better bound on the length of routing and smaller r requires a smaller number of ports and links on the target network.

For λ=1 (i.e., a Steiner system), each block of size k is unique for all possible pairs of k nodes that it contains. That implies that each possible pairing of nodes in a block corresponds to a unique candidate edge for the target topology. Furthermore, since such an edge never occurs in any other block, the virtual rings are mutually edge-disjoint. Thus, each block of size k can induce a complete graph of k nodes. In graph theory, any graph with k nodes can be embedded into a complete graph with k nodes.

Using the foregoing principles, the present invention provides a new class of interconnect networks and multiple incomplete fabric interconnect systems that can be used to simultaneously scale the performance and the reliability of either multi-computer cluster systems or switched input/output systems, while using fewer components than a traditional approach. In doing so, each end node, such as a computer or network-attached I/O device, has more than two network interface ports. The multiple ports can be provided either through the use of computers with network interface cards (NICs), each having one or more ports, or through the use of multi-port I/O nodes. Preferably, this approach takes advantage of the dual-ported NICs that that are a key part of widely used networks including, for example, ServerNet networks designed by the Hewlett-Packard Corporation. Such an approach can also be implemented in networks including Ethernet, GigaNet, Fiber Channel, ATM (Asynchronous Transfer Mode), RDMA-enabled Ethernet, PCI Xpress, InfiniBand or other networks to be developed in the future.

To better understand the present invention, consider that a fabric is a collection of routers and links that interconnect a set of nodes. A node may have one or more NICs (network interface cards), each with two or more ports. Among other things, each port allows a node to be on a distinct fabric. In one embodiment of the invention, fabrics, ports and routers have color restrictions. For example, ports and routers are either red or green (note that the coloring described here can also be described with reference to X and Y designations). In a coloring scenario case, it is illegal to connect a red port or router to a green port or router; each fabric connects either red ports using only red routers (i.e., a red fabric) or green ports using only green routers (i.e., a green fabric), but there is no interconnection between colors. The larger problems underlying network topology design are well understood—minimizing diameter, maximizing bisection width, minimizing the number of routers, avoiding excessive link contention and avoiding hot links—and assumed to be important here. In other embodiments of the invention, coloring constraints are eliminated.

Several non-trivial issues unique to multi-fabric topologies will now be examined. More particularly, a determination of how large each fabric needs to be will be examined. As a fundamental matter, fabrics must collectively provide at least one path between each pair of nodes. While this can be accomplished with a large number of fabrics, a number of fabrics larger than necessary can waste routers, thereby increasing costs, by making redundant connections between nodes.

A determination of how many fabrics are needed is also important: This is an important yet difficult matter to determine. In one embodiment of the invention, this number of fabrics is bounded above and/or below to determine an approximation for an optimal solution. As before, this will ensure that each pair of nodes appear together in at least one fabric, given a specific fabric size.

It is evident that redundant connections are inevitable in all but the simplest of cases. Should redundant connections be present, a pair of nodes will co-occur in more than one fabric. Further, within each fabric, distance between nodes will vary from pair to pair. Rather than have a pair of nodes be far apart in all fabrics—and have other pairs be close together in more than one fabric—nodes within a fabric should be so arranged that distances between otherwise far nodes become smaller, perhaps at the expense of increasing the distance between otherwise closely connected nodes. Given f, the number of nodes that fit easily within a COTS (commercial off-the-shelf) rack frame, it is desirable that the number of wires that need to travel between frames be kept within reasonable limits.

It should be noted that the multi-fabric design problem discussed here is different from the problem of multiple ports in one fabric. For example, multiple fabrics according to the present invention are likely to provide better protection for nodes against faults and congestion. Moreover, the diameter of a multi-fabric network according to the present invention is generally smaller than that of its single-fabric counterpart. This not only reduces the number of outstanding packets necessary for keeping pipelines full but also lessens the impact of output-port contention on link utilization. In effect, the multiple fabrics of the present invention create congestion-containment domains.

To further understand the present invention, consider the following problem: given n nodes, each node connecting top different fabrics, what is (1) the minimum number of fabrics and (2) the minimum fabric cardinality required to ensure full connectivity between all nodes? Furthermore, what is a minimal assignment of connections to fabrics?

While the present invention is appropriate for colored and non-colored fabric implementation, implementations that completely ignore color will be first considered. In doing so, it has been found that n nodes can be connected using k fabrics of vertex cardinality m such that $$\left\lceil \frac{\binom{n}{2}}{\binom{m}{2}} \right\rceil \leq k \qquad \text{(Equation 3)}$$

where $\lceil \cdot \rceil$ represents rounding up to the next whole number and $$\binom{i}{j}$$

represents the binomial coefficient $C^i_j$ such that $$C^i_j = \frac{i!}{j!(i-j)!} \triangleq \binom{i}{j}$$

denotes the number of sub-populations of size j that can be chosen from a set of size i (i.e., i choose j). The above inequality follows from the requirement that every pair of nodes must be connected by at least one fabric. Moreover, since each fabric generates at most $$\binom{m}{2}$$

pairs, and connectedness requires at least $$\binom{n}{2}$$

pairs, the resulting lower bound on the number of fabrics, k, follows.

In now considering the lower bound on fabric size, the neighborhood relationships of a single node are examined to impose a constraint that a node has to connect to all of its peers through a-finite (and preferably small) number of ports. Using concepts from graph theory, consider that a node forms a vertex on a graph and an edge is an unordered pair of distinct vertices. It has therefore been found that with n nodes, each with p ports connected using fabrics of vertex cardinality m (i.e., the number of vertices), then $$m \geq \left\lceil \left(\frac{n+p-1}{p}\right) \right\rceil.$$ (Equation 4)

First, because a node has only p ports, it cannot connect to more than p fabrics. Moreover, because each fabric offers connections to only m−1 other neighbors, m must be large enough to cover all neighbors. Therefore, $$\left\lceil \frac{n-1}{m-1} \right\rceil \leq p$$

such that $(n-1) \leq p(m-1)$ $(n-1) \leq pm - p$ which we manipulate into the form $$m \geq \left\lceil \left(\frac{n+p-1}{p}\right) \right\rceil.$$

A straightforward example reinforces the above aspects of the present invention. As shown in FIG. 1, consider interconnecting 7 nodes each with 3 ports. In fact, this problem corresponds to the BIBD of 2−(7, 3, 1)=7, that is, seven (7) groups are needed to connect seven (7) items, arranged in groups of three (3), such that a pair appears in exactly one (1) group. Since each node must communicate to its 6 peers via only 3 ports, each fabric must have a size (i.e., vertex cardinality) at least 3, according to Equation 4:

$$m \geq \left\lceil \frac{7+3-1}{3} \right\rceil$$

$m \geq 3.$

Moreover, the minimum number of fabrics, according to Equation 3 is $$\left\lceil \frac{\binom{7}{2}}{\binom{3}{2}} \right\rceil \leq k$$

$7 \leq k.$

In this example, it is important to note that these lower bounds provide tight bounds. Indeed, the fact that both these lower bounds are tight, at least for certain cases, is illustrated by an assignment of nodes to fabrics as shown in Table 2.

TABLE 2

| Fabric | Assignment of Nodes | | |
| --- | --- | --- | --- |
|  | Node 1 | Node 2 | Node 3 |
| 1 | 1 | 2 | 3 |
| 2 | 1 | 4 | 5 |

TABLE 2-continued

| Fabric | Assignment of Nodes | | |
| --- | --- | --- | --- |
|  | Node 1 | Node 2 | Node 3 |
| 3 | 1 | 6 | 7 |
| 4 | 2 | 4 | 6 |
| 5 | 2 | 5 | 7 |
| 6 | 2 | 5 | 6 |
| 7 | 3 | 4 | 7 |

This shows that 7 fabrics of size 3 are not merely the minimum requirement but are also sufficient in this case. This interconnection of fabrics is further shown in FIG. 1.

It is found that the coloring of fabrics adds strong constraints to the fabric partitioning problem. In fact, multi-fabric design with nodes having only two ports, each a different color, is impractical in all but the most trivial cases. Consider that if each node has two ports, one red and one green, then at least one fabric must connect all the nodes. This result can be shown by contradiction. For example, suppose that a node n connects to a red fabric $F_R$ and a green fabric $F_G$ in such a fashion that neither $F_R$ nor $F_G$ connects all the nodes together, that is, $F_R \subset N$ and
$F_G \subset N$ where N is the set of all nodes. Thus, either $F_R \cup F_G = N$ or $F_R \cup F_G$ is a strictly proper subset of N.

Since the latter would imply incomplete connectivity for n, only the former can be accepted. Therefore, $F_R \cup F_G = N.$ Since node n belongs to both red and green fabrics, there must exist nodes $n_R \in F_R$
and
$n_G \in F_G$
such that
$n_R \neq n_G,$
$n_R \notin F_G,$ and
$n_G \notin F_R.$ In order to achieve complete connectivity between all pairs of nodes, it is therefore necessary to add a fabric, say $F_X$, that will connect $n_R$ to $n_G$ where $F_X$ could be neither red nor green. Because, it is impossible to connect $n_R$ to $n_G$ using colored fabrics as constrained above, a contradiction exists. The only available ports for connecting to $F_X$ on $n_R$ is green and on $n_G$, red. Because our supposition has been contradicted, the opposite must be true, that is, at least one fabric must connect all the nodes.

It is because of this result that multi-fabric design was not attempted in prior art systems with only two ports, such as ServerNet I. With the availability of multi-port equipment, such as dual-PCI Compaq Professional Workstation platforms that support two NICs each with two ports, called the X and Y ports in ServerNet parlance, multi-fabric designs are now feasible and, indeed, desirable for their advantages. With regard to a particular embodiment of the invention, it has been found that ServerNet II offers a flexible coloring of ports so that even with only one ServerNet II NIC, a node can have two ports of the same color. Partitioned fabric designs according to the present invention are therefore practical even in systems having only one ServerNet II NIC per node, but not practical in systems with only one ServerNet I NIC per node.

The further advantage of ServerNet II's flexible coloring of NIC ports becomes apparent when the fabric-partitioning solution described in Table 2 is examined. If all ports were the same color, the solution described above would function properly because fabric coloring would not be an issue. For nodes with a pair of ServerNet I NICs, however, two of the four ports on each node are X ports and two are Y ports. ServerNet I NICs and routers set and check the path bit in almost all packets (except for default ports on routers) and, in general, it is not possible to route packets between X and Y ports and/or routers. With regard to Table 2, rows of the table (or, fabrics) need to be colored in such a way that no node appears in more than two fabrics of the same color.

Let us now consider a specific impossibility argument in the context of Table 2 and then a general theorem for partitions with an odd number of fabrics. Without loss of generality, suppose that a fabric, say Fabric 1, is colored red. Since Node 1 has only two red ports and it appears on a total of three fabrics, it must be that at least one of the other two fabrics on which it appears must be green. Again, without loss of generality, suppose that a second fabric, say Fabric 2, is painted green. Applying the same argument to Node 2, either Fabric 4 or Fabric 5 must be green. Suppose that Fabric 4 is green. Next, consider Fabric 7. Since both the green ports on Node 4 are used up, this fabric must be painted red. Doing so uses up both the red ports on Node 3. Hence, Fabric 6 must be painted green. Doing so uses up both the green ports at Node 5. Hence, Fabric 5 must be painted red. Now, we need to assign a color to Fabric 3 which connects Nodes 1, 6 and 7, but both green ports are used up on Node 6 as well as both red ports on Node 7. It is therefore impossible to pick a color for Fabric 3.

In proceeding, we will further be constrained by the fact that it is not possible to color an odd number of fabrics with two colors—say, red and green—if each node has an equal number of red and green ports and the node-to-fabric assignment.

Having now considered lower bounds, to be able to grasp upper bounds is also desirable. Although redundancy may be inevitable, redundancy can be quantified by fixing at the outset the number of nodes that will co-occur in all fabrics. Optimal solutions will not always be possible, but an interesting effect is that we can always come up with a feasible solution. Since the solutions so found yield closed-form expressions for the size and the number of fabrics, those expressions serve as upper bounds on the respective quantities. The key observation here is that many nodes may connect to the same collection of fabrics, and these equivalent nodes can be handled together in an equivalence class. Equivalence classes can be thought of as nodes that always co-occur in fabrics. Equivalence classes are a natural algebraic abstraction for the multi-fabric design problem because connectedness, the primary relationship of interest here, is, algebraically speaking, an equivalence relation in that it is trivially reflexive, symmetric and transitive. A solution is constructed by increasing the number of equivalence classes. For the degenerate and trivial cases of one or two classes, a single fabric connects all nodes, and each node needs only one fabric connection. That stated, we turn to more useful designs.

Figure 2:
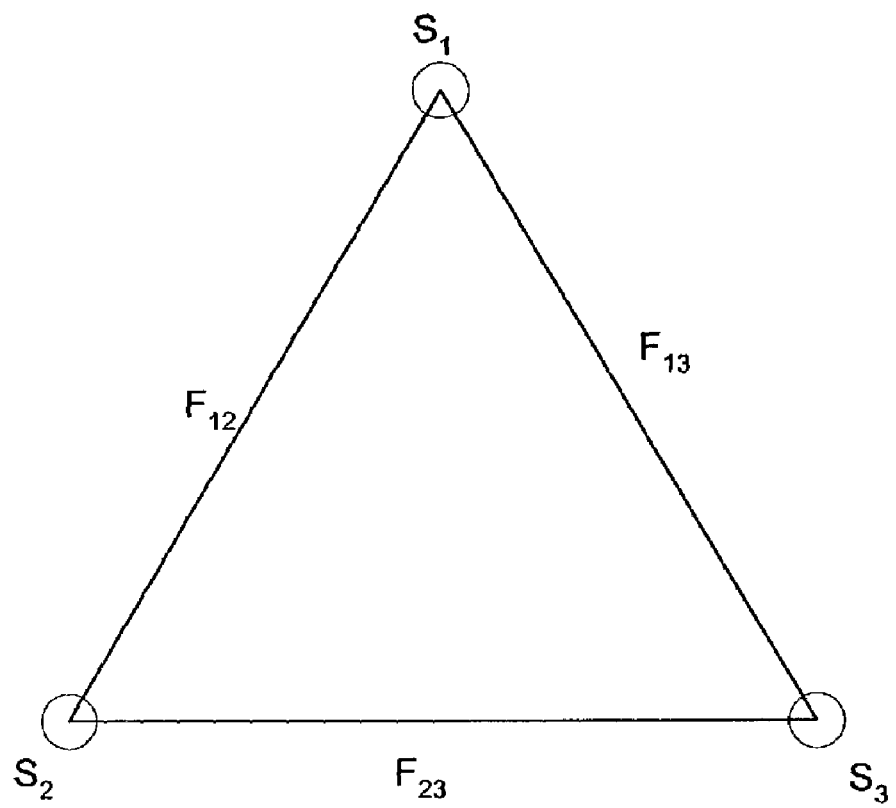
FIG. 2 is a network diagram for interconnecting three elements using three fabrics.
Figure 3:
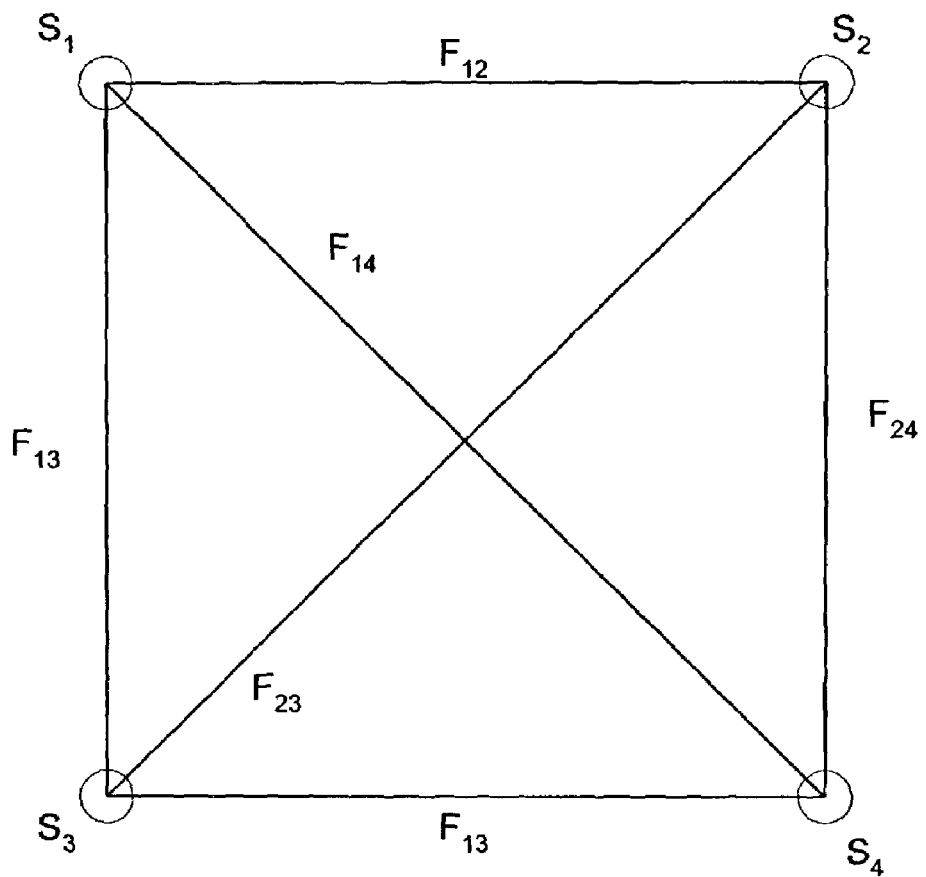
FIG. 3 is a network diagram for interconnecting four elements using six fabrics.

Partitioning nodes into three equivalence classes, $S_1$, $S_2$ and $S_3$, as shown in FIG. 2, each node has two connections and there are three total fabrics. Fabric $F_{12}$ connects all the nodes in $S_1$ and $S_2$, Fabric $F_{13}$ connects all nodes in $S_1$ and $S_3$, and Fabric $F_{23}$ connects all nodes in $S_2$ and $S_3$. With four equivalence classes, as shown in FIG. 3, each node connects to three fabrics and there are $$\binom{4}{2} = 6 \text{ different fabrics in all.}$$

Figure 4:
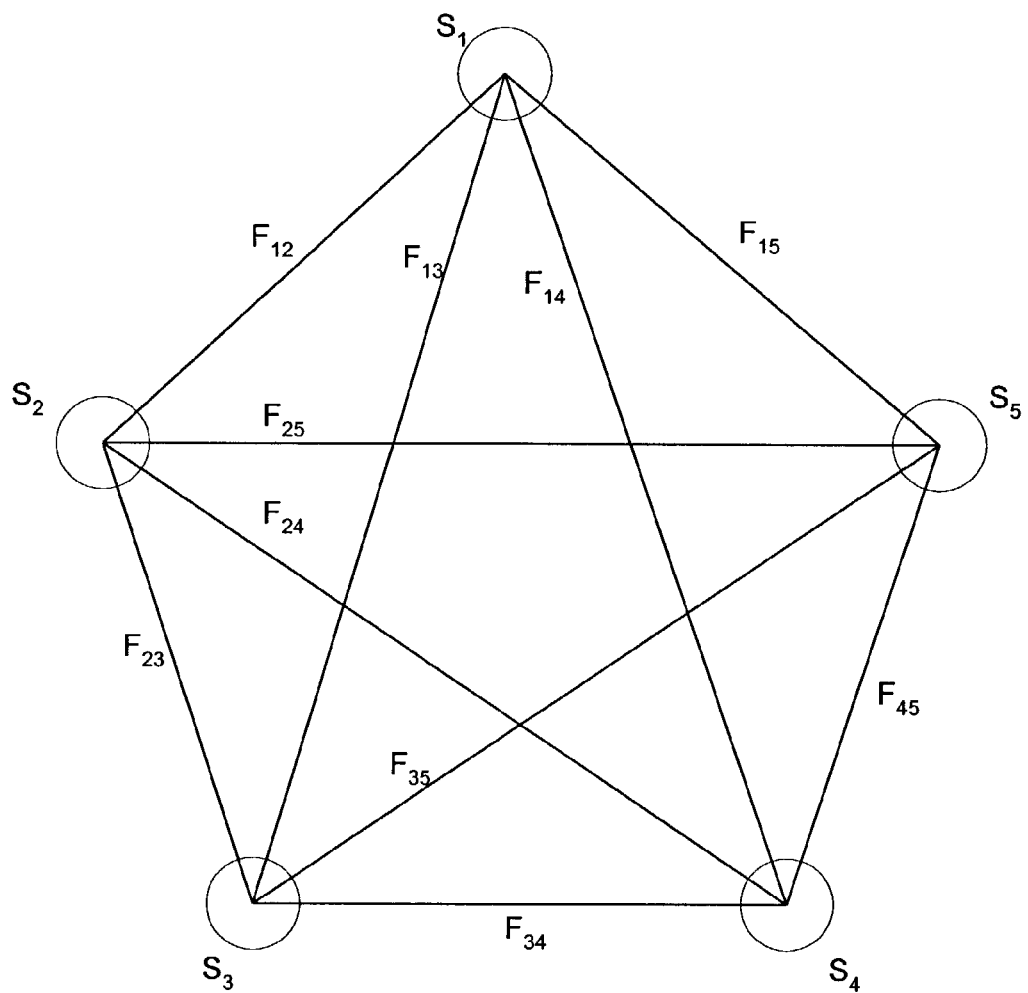
FIG. 4 is a network diagram for interconnecting five elements using ten fabrics.

With five equivalence classes, as shown in FIG. 4, each node connects to four fabrics and there are $$\binom{5}{2} = 10 \text{ total fabrics.}$$

Figure 5:
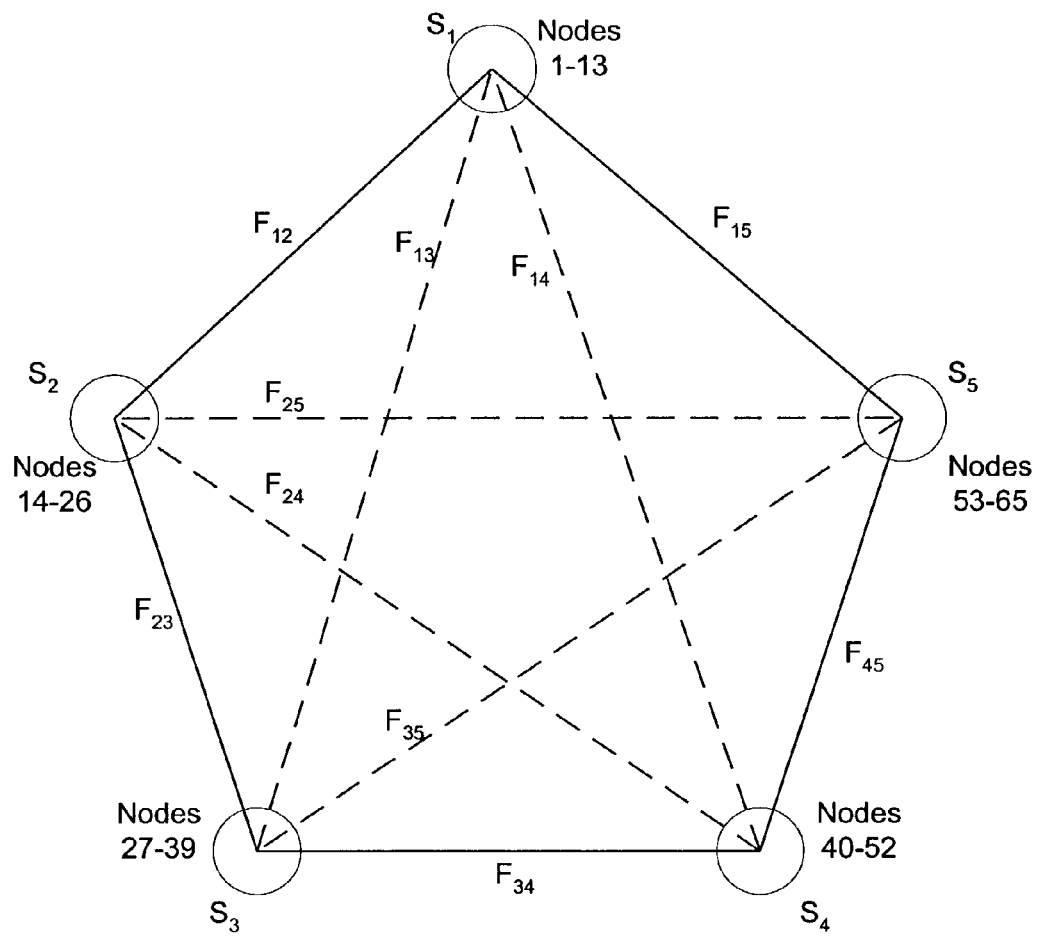
FIG. 5 is a network diagram for connecting 65 nodes using five elements and ten fabrics.

More particularly, the network of FIG. 4 can be considered for an interconnection of a 64-node cluster with four connections. In an embodiment this is achieved with two SHIP cards, each with an X port and a Y port. With these specifications, the network of FIG. 5 is built. In order to simplify design, the nodes are partitioned into equivalence classes where each fabric is a pairing of equivalence classes. With five equivalence classes, S1-S5 as shown in FIG. 5, each node connects to four fabrics and there are ten total fabrics. Rounding the number of nodes up to 65, we have 13 (i.e., 65/5=13) nodes per class with each fabric connecting 26 (i.e., 2×13=26) nodes. Note that if each fabric were a simple Steiner tree, 26 nodes would require 6 routers such that the 64-node configuration can be done in 6*10=60 routers. The complete solution is therefore shown in FIG. 5. Coloring constraints are easily satisfied because the perimeter of the pentagon can be built with X fabrics (shown as solid lines) and the core with Y fabrics (shown as dashed lines). Indeed, an important result of the present invention is that it provides for fault-tolerant systems; the occurrence of a failure anywhere in the system will not render the rest of the system useless. Moreover, the present invention provides for redundant interconnection paths such that if a fail does occur, a redundant path is available.

Indeed, this solution can be extended to more general network configurations with the understanding of equivalence classes. For nodes with p ports, there are (p+1) equivalence classes. With n such nodes, the vertex cardinality of each fabric is given by $$P = 2\left\lceil \frac{n}{p+1} \right\rceil.$$

This solution is better understood with a full understanding of equivalence classes. The resulting network topologies are interesting. Bisection bandwidth is observed to be good for these topologies, but it can be difficult to compute because the number of classes is usually odd. Using a tree for each fabric, the 64-node topology discussed above has a bisection bandwidth of greater than ten (10) links. Because of the high cost of the 60 routers, adoption of such a design can be difficult. The quality of solutions generated—as quantified by, say, bisection width and number of routers needed—depends upon the size of equivalence classes. The smaller the class size, the lesser is the number of connections that repeat in all fabrics. Because each node participates in p fabrics, the connections within a node's equivalence class are redundantly repeated (p−1) times. Thus, it can be seen that the larger the class size, the greater is the waste. Since each fabric connects only two classes (which is an arbitrary restriction), given the lower bounds on fabric size discussed above, class size must be at least $$\text{Class size} \geq \left\lceil \frac{n+p-1}{2p} \right\rceil.$$

For the 64-node topology, the bounds of the present invention suggest a minimum fabric size of 17, and a minimum fabric count of 15. At the fabric size of 26, a large enough fabric size is used, but, subjectively, a large number of fabrics may be in use. At this fabric size, the lower bound on the number of fabrics is 7. At 10 fabrics, the network is significantly above the minimum necessary. Whereas the present invention confirms the existence of a feasible solution, its results can be less than optimal. Moreover, the present invention can be used to contrast its choice of fabric parameters against lower bounds and also to state upper bound results. Furthermore, it is guaranteed that the hard-to-satisfy color constraint of multi-fabric partitioning will be satisfied in designs according to the present invention.

The bounding results of the present invention are therefore summarized here for the optimal fabric size

| Fabric Parameter | Lower Bound | Upper Bound |
|---|---|---|
| Optimal Fabric Size ($m_O$) | $\left\lceil \frac{n+p-1}{p} \right\rceil$ | $2\left\lceil \frac{n}{p+1} \right\rceil$ | and the optimal number of fabrics

| Fabric Parameter | Lower Bound | Upper Bound |
|---|---|---|
| Optimal Number of Fabrics ($k_O$) | $\left\lceil \frac{\binom{n}{2}}{\binom{m}{2}} \right\rceil$ | $\binom{p+1}{2}$ |

Figure 6:
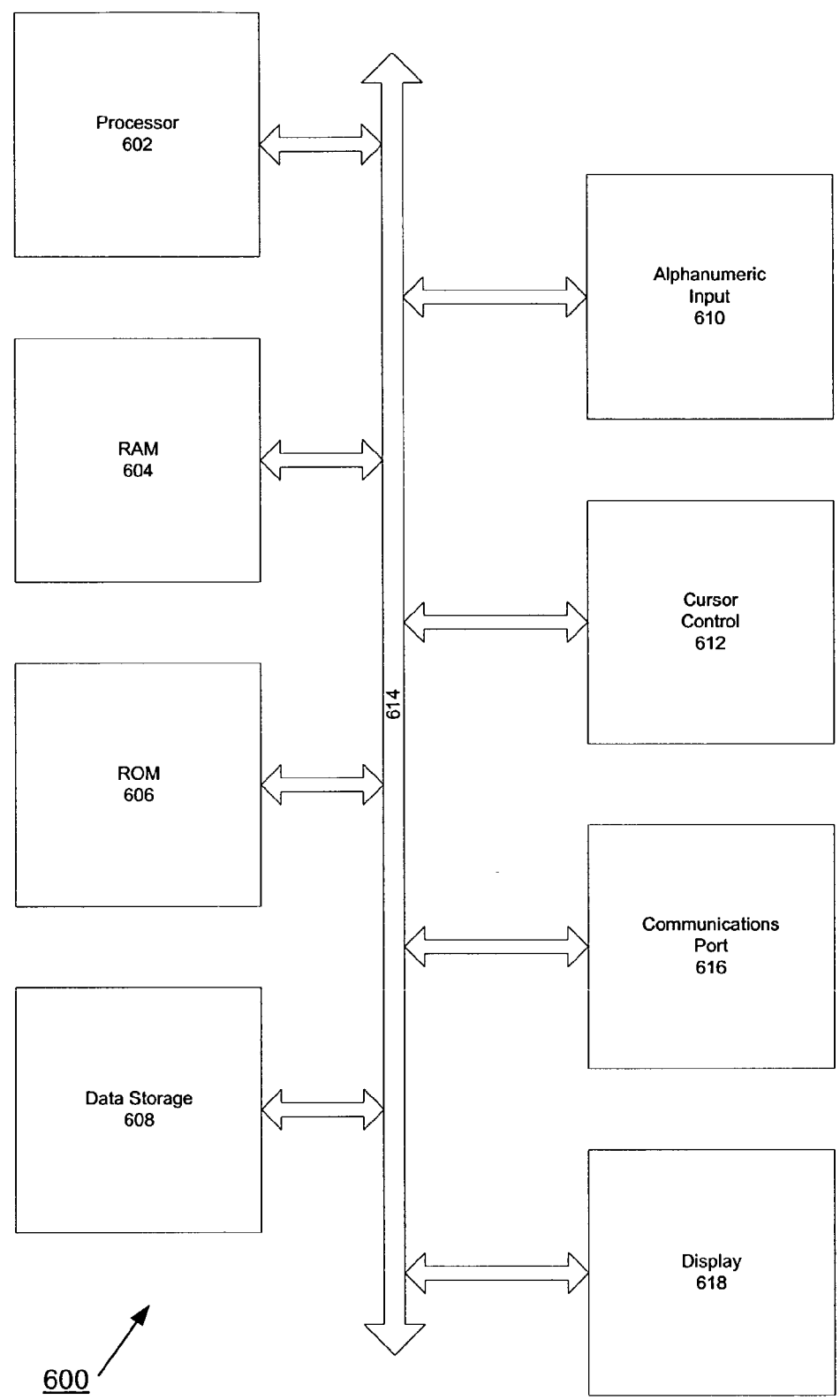
FIG. 6 is a diagram of an exemplary computer system.

In an embodiment, the present invention is practiced on a computer system 600 as shown in FIG. 6. Referring to FIG. 6, an exemplary computer system 600 (e.g., personal computer, workstation, mainframe, etc.) upon which the present invention may be practiced is shown. When configured to practice the present invention, system 600 becomes a computer aided design (CAD) tool suitable for assisting in designing interconnect systems in large and small scale applications. Computer system 600 is configured with a data bus 614 that communicatively couples various components. As shown in FIG. 6, processor 602 is coupled to bus 614 for processing information and instructions. A computer readable volatile memory such as RAM 604 is also coupled to bus 614 for storing information and instructions for the processor 602. Moreover, computer readable read only memory (ROM) 606 is also coupled to bus 614 for storing static information and instructions for processor 602. A data storage device 606 such as a magnetic or optical disk media is also coupled to bus 614. Data storage device 606 is used for storing large amounts of information and instructions. An alphanumeric input device 610 including alphanumeric and function keys is coupled to bus 614 for communicating information and command selections to the processor 602. A cursor control device 612 such as a mouse is coupled to bus 614 for communicating user input information and command selections to the central processor 602. Input/output communications port 616 is coupled to bus 614 for communicating with a network, other computers, or other processors, for example. Display 618 is coupled to bus 614 for displaying information to a computer user. Display device 618 may be a liquid crystal device, cathode ray tube, or other display device suitable for creating graphic images and alphanumeric characters recognizable by the user. The alphanumeric input 610 and cursor control device 612 allow the computer user to dynamically signal the two dimensional movement of a visible symbol (pointer) on display 618.

While various embodiments and advantages of the present invention have been described, it will be recognized that a number of variations will be readily apparent. For example, in implementing equivalence classes the present invention can be scaled to implement networks of many sizes. Thus, the present teachings may be widely applied consistent with the foregoing disclosure and the claims which follow

What is claimed is:

1. A multi-fabric interconnection system, comprising:
k interconnection fabrics each comprising a plurality of routers and interconnection links, each having a vertex cardinality, m; and
n nodes each having p ports, wherein p is greater than two, and wherein every pair of nodes from among the n nodes is interconnected through at least one of the k interconnection fabrics,
where each of the k interconnection fabrics interconnects less than all of the n nodes, wherein the number k of interconnection fabrics is bounded above and below by the relationships $$k \leq \binom{p+1}{2} \text{ and } k \geq \left\lceil \frac{\binom{n}{2}}{\binom{m}{2}} \right\rceil, \text{ respectively.}$$

2. The interconnection system of claim 1, wherein the k interconnection fabrics provide redundant interconnection paths between every pair of nodes from among the n nodes.

3. A multi-fabric interconnection system, comprising:
k interconnection fabrics each comprising a plurality of routers and interconnection links, each having a vertex cardinality, m; and
n nodes each having p ports, wherein p is greater than two, and wherein every pair of nodes from among the n nodes is interconnected through at least one of the k interconnection fabrics,
wherein each of the k interconnection fabrics interconnects less than all of the n nodes, wherein the vertex cardinality, m, is bounded above and below by the relationships $$m \leq 2\left\lceil \frac{n}{p+1} \right\rceil \text{ and } m \geq \left\lceil \frac{n+p-1}{p} \right\rceil, \text{ respectively.}$$

4. A multi-fabric interconnection system, comprising:
k interconnection fabrics, each having a vertex cardinality, m; and n nodes each having p ports, wherein p is greater than two, and wherein every pair of nodes from among the n nodes is interconnected through at least one of the k interconnection fabrics, wherein every pair from among the p ports is interconnected to at least one of k interconnection fabrics, and wherein each of the k interconnection fabrics interconnects less than all of the n nodes, wherein the number k of the interconnection fabrics is bounded above and below by the relationships $$k \le \binom{p+1}{2} \text{ and } k \ge \left\lceil \frac{\binom{n}{2}}{\binom{m}{2}} \right\rceil, \text{ respectively.}$$

5. The interconnection system of claim 4, wherein the vertex cardinality, m, is bounded above and below by the relationships $$m \le 2\left\lceil \frac{n}{p+1} \right\rceil \text{ and } m \ge \left\lceil \frac{n+p-1}{p} \right\rceil, \text{ respectively.}$$

6. The interconnection system of claim 4, wherein the k interconnection fabrics provide redundant interconnection paths between every pair of nodes from among the n nodes.

7. A multi-fabric interconnection system, comprising:
  k interconnection fabrics each having a vertex cardinality, m; and
  n nodes each having p ports, wherein p is greater than two, and wherein every pair of nodes from among the n nodes is interconnected through at least one of the k interconnection fabrics, wherein the vertex cardinality, m, is bounded above and below by the relationships $$m \le 2\left\lceil \frac{n}{p+1} \right\rceil \text{ and } m \ge \left\lceil \frac{n+p-1}{p} \right\rceil, \text{ respectively.}$$

8. The interconnection system of claim 7, wherein the number k of interconnection fabrics is bounded above and below by the relationships $$k \le \binom{p+1}{2} \text{ and } k \ge \left\lceil \frac{\binom{n}{2}}{\binom{m}{2}} \right\rceil, \text{ respectively.}$$

9. The interconnection system of claim 7, wherein the k interconnection fabrics provide redundant interconnection paths between every pair of nodes from among the n nodes.

10. A multi-fabric interconnection system, comprising:
  k incomplete interconnection fabrics each having a vertex cardinality, m; and
  n nodes each having p ports, wherein p is greater than two, and wherein every pair of nodes from among the n nodes is interconnected through at least one of the k incomplete interconnection fabrics, wherein the vertex cardinality, m, is bounded above and below by the relationships $$m \le 2\left\lceil \frac{n}{p+1} \right\rceil \text{ and } m \ge \left\lceil \frac{n+p-1}{p} \right\rceil, \text{ respectively.}$$

11. The interconnection system of claim 10, wherein the number k of interconnection fabrics is bounded above and below by the relationships $$k \le \binom{p+1}{2} \text{ and } k \ge \left\lceil \frac{\binom{n}{2}}{\binom{m}{2}} \right\rceil, \text{ respectively.}$$

12. The interconnection system of claim 10, wherein the k interconnection fabrics provide redundant interconnection paths between every pair of nodes from among the n nodes.

13. A method for implementing a multi-fabric interconnection system, comprising:
  providing k interconnection fabrics each having a vertex cardinality, m; and
  providing n nodes each having p ports, wherein p is greater than two, and wherein every pair of nodes from among the n nodes is interconnected through at least one of the k interconnection fabrics,
  wherein each of the k interconnection fabrics interconnects less than all of the n nodes, wherein the vertex cardinality, m, is bounded above and below by the relationships $$m \le 2\left\lceil \frac{n}{p+1} \right\rceil \text{ and } m \ge \left\lceil \frac{n+p-1}{p} \right\rceil, \text{ respectively.}$$

14. The method of claim 13, wherein the number k of interconnection fabrics is bounded above and below by the relationships $$k \le \binom{p+1}{2} \text{ and } k \ge \left\lceil \frac{\binom{n}{2}}{\binom{m}{2}} \right\rceil, \text{ respectively.}$$

15. The method of claim 13, wherein the k fabrics provide redundant interconnection paths between every pair of nodes from among the n nodes.

16. A method for implementing a multi-fabric interconnection system, comprising:
  providing k interconnection fabrics, each having a vertex cardinality, m; and
  providing n nodes each having p ports, wherein p is greater than two, and wherein every pair of nodes from among the n nodes is interconnected through at least one of the k interconnection fabrics,
  wherein every pair from among the p ports is interconnected to at least one of k interconnection fabrics, and wherein each of the k interconnection fabrics interconnects less than all of the n nodes, wherein the number k of the interconnection fabrics is bounded above and below by the relationships $$k \le \binom{p+1}{2} \text{ and } k \ge \left\lceil \frac{\binom{n}{2}}{\binom{m}{2}} \right\rceil, \text{ respectively.}$$

17. The method of claim 16, wherein the vertex cardinality, m, is bounded above and below by the relationships $$m \le 2\left\lceil \frac{n}{p+1} \right\rceil \text{ and } m \ge \left\lceil \frac{n+p-1}{p} \right\rceil, \text{ respectively.}$$

18. The method of claim 16, wherein the k fabrics provide redundant interconnection paths between every pair of nodes from among the n nodes.

19. A method for implementing a multi-fabric interconnection system, comprising:
providing k interconnection fabrics each having a vertex cardinality, m; and
providing n nodes each having p ports, wherein p is greater than two, and wherein every pair of nodes from among the n nodes is interconnected through at least one of the k interconnection fabrics, wherein the vertex cardinality, m, is bounded above and below by the relationships $$m \le 2\left\lceil \frac{n}{p+1} \right\rceil \text{ and } m \ge \left\lceil \frac{n+p-1}{p} \right\rceil, \text{ respectively.}$$

20. The method of claim 19, wherein the number k of interconnection fabrics is bounded above and below by the relationships $$k \le \binom{p+1}{2} \text{ and } k \ge \left\lceil \frac{\binom{n}{2}}{\binom{m}{2}} \right\rceil, \text{ respectively.}$$

21. The method of claim 19, wherein the k fabrics provide redundant interconnection paths between every pair of nodes from among the n nodes.

22. A computer-readable medium embodying program code for implementing a multi-fabric interconnection system having instructions that cause a computer to perform steps, comprising:
interconnecting k fabrics each having a vertex cardinality, m; and
interconnecting n nodes each having p ports, wherein p is greater than two, and wherein every pair of nodes from among the n nodes is interconnected through at least one of the k interconnection fabrics,
wherein each of the k interconnection fabrics interconnects less than all of the n nodes wherein the number k of interconnection fabrics is bounded above and below by the relationships $$k \le \binom{p+1}{2} \text{ and } k \ge \left\lceil \frac{\binom{n}{2}}{\binom{m}{2}} \right\rceil, \text{ respectively.}$$

23. The computer-readable medium of claim 22, wherein the vertex cardinality, m, is bounded above and below by the relationships $$m \le 2\left\lceil \frac{n}{p+1} \right\rceil \text{ and } m \ge \left\lceil \frac{n+p-1}{p} \right\rceil, \text{ respectively.}$$

24. The computer-readable medium of claim 22, wherein the k fabrics provide redundant interconnection paths between every pair of nodes from among the n nodes.

25. A computer-readable medium embodying program code for implementing a multi-fabric interconnection system having instructions that cause a computer to perform steps, comprising:
interconnecting k fabrics each having a vertex cardinality, m; and
interconnecting n nodes each having p ports, wherein p is greater than two, and wherein every pair of nodes from among the n nodes is interconnected through at least one of the k interconnection fabrics,
wherein every pair from among the p ports is interconnected to at least one of k interconnection fabrics, and wherein each of the k interconnection fabrics interconnects less than all of the n nodes, wherein the vertex cardinality, m, is bounded above and below by the relationships $$m \le 2\left\lceil \frac{n}{p+1} \right\rceil \text{ and } m \ge \left\lceil \frac{n+p-1}{p} \right\rceil, \text{ respectively.}$$

26. The computer-readable medium of claim 25, wherein the number k of the interconnection fabrics is bounded above and below by the relationships $$k \le \binom{p+1}{2} \text{ and } k \ge \left\lceil \frac{\binom{n}{2}}{\binom{m}{2}} \right\rceil, \text{ respectively.}$$

27. The computer-readable medium of claim 25, wherein the k fabrics provide redundant interconnection paths between every pair of nodes from among the n nodes.

28. A computer-readable medium embodying program code for implementing a multi-fabric interconnection system having instructions that cause a computer to perform steps, comprising:
interconnecting k fabrics each having a vertex cardinality, m; and
interconnecting n nodes each having p ports, wherein p is greater than two, and wherein every pair of nodes from among the n nodes is interconnected through at least one of the k interconnection fabrics, wherein the number k of interconnection fabrics is bounded above and below by the relationships $$k \le \binom{p+1}{2} \text{ and } k \ge \left\lceil \frac{\binom{n}{2}}{\binom{m}{2}} \right\rceil, \text{ respectively.}$$

29. The computer-readable medium of claim 28, wherein the vertex cardinality, m, is bounded above and below by the relationships $$m \le 2\left\lceil \frac{n}{p+1} \right\rceil \text{ and } m \ge \left\lceil \frac{n+p-1}{p} \right\rceil, \text{ respectively.}$$

30. The computer-readable medium of claim 28, wherein the k fabrics provide redundant interconnection paths between every pair of nodes from among the n nodes.

31. A computer-readable medium embodying program code for implementing a multi-fabric interconnection system having instructions that cause a computer to perform steps, comprising:
    interconnecting k incomplete fabrics each having a vertex cardinality, m; and
    interconnecting n nodes each having p ports, wherein p is greater than two, and wherein every pair of nodes from among the n nodes is interconnected through at least one of the k incomplete interconnection fabrics, wherein the number k of interconnection fabrics is bounded above and below by the relationships $$k \le \binom{p+1}{2} \text{ and } k \ge \left\lceil \frac{\binom{n}{2}}{\binom{m}{2}} \right\rceil, \text{ respectively.}$$

32. The computer-readable medium of claim 31, wherein the vertex cardinality, m, is bounded above and below by the relationships $$m \le 2\left\lceil \frac{n}{p+1} \right\rceil \text{ and } m \ge \left\lceil \frac{n+p-1}{p} \right\rceil, \text{ respectively.}$$

33. The computer-readable medium of claim 31, wherein the k incomplete fabrics provide redundant interconnection paths between every pair of nodes from among the n nodes.

* * * * *

UNITED STATES PATENT AND TRADEMARK OFFICE
CERTIFICATE OF CORRECTION

PATENT NO. : 7,468,982 B2  
APPLICATION NO. : 10/291865  
DATED : December 23, 2008  
INVENTOR(S) : Pankaj Mehra et al.

It is certified that error appears in the above-identified patent and that said Letters Patent is hereby corrected as shown below:

In column 1, line 21, delete "modem" and insert -- modern --, therefor.

In column 10, line 28, delete " $F_R \cup F = N$ " and insert -- $F_R \cup F_G = N$ --, therefor.

In column 10, line 42, delete " $n_{R \oplus G}$, " and insert -- $n_R \notin F_G$, --, therefor.

In column 14, line 32, in Claim 1, delete "where" and insert -- wherein --, therefor.

In column 15, line 35, in Claim 7, delete "then" and insert -- the n --, therefor.

In column 17, line 65, in Claim 22, delete "nodes" and insert -- nodes, --, therefor.

Signed and Sealed this

Fourth Day of August, 2009

JOHN DOLL  
*Acting Director of the United States Patent and Trademark Office*